United States Patent
Han et al.

(10) Patent No.: US 9,720,499 B2
(45) Date of Patent: Aug. 1, 2017

(54) DISPLAY APPARATUS

(71) Applicant: SAMSUNG ELECTRONICS CO., LTD., Suwon-si (KR)

(72) Inventors: Young-ran Han, Seoul (KR); Jong-hoon Kim, Suwon-si (KR); Seung-myen Lee, Suwon-si (KR); Kyoung-oh Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 187 days.

(21) Appl. No.: 14/146,057

(22) Filed: Jan. 2, 2014

(65) Prior Publication Data

US 2014/0368461 A1 Dec. 18, 2014

(30) Foreign Application Priority Data

Jun. 17, 2013 (KR) .................. 10-2013-0069290

(51) Int. Cl.
G06F 3/01 (2006.01)
G06F 3/041 (2006.01)
G06F 3/042 (2006.01)
G06F 3/043 (2006.01)

(52) U.S. Cl.
CPC ............ *G06F 3/016* (2013.01); *G06F 3/043* (2013.01); *G06F 3/0416* (2013.01); *G06F 3/0421* (2013.01)

(58) Field of Classification Search
CPC ........ G06F 3/016; G06F 3/0416; G06F 3/043; G06F 3/0421
See application file for complete search history.

(56) References Cited

U.S. PATENT DOCUMENTS

| | | | |
|---|---|---|---|
| 4,812,830 A | 3/1989 | Doering | |
| 2007/0070046 A1* | 3/2007 | Sheynblat | G06F 3/0433 345/173 |
| 2008/0122792 A1* | 5/2008 | Izadi | G06F 3/0421 345/173 |

(Continued)

FOREIGN PATENT DOCUMENTS

KR 10-1025722 B1 4/2011

OTHER PUBLICATIONS

Communication dated Mar. 6, 2015 issued by the European Patent Office in counterpart European Patent Application No. 14152177.3.

*Primary Examiner* — Andrew Sasinowski
(74) *Attorney, Agent, or Firm* — Sughrue Mion, PLLC

(57) ABSTRACT

A display apparatus having a screen on which recording by a user's touch can be performed is provided. The display apparatus includes a display configured to provide the screen, an accommodator configured to accommodate the display and having a screen aperture formed thereon with a predetermined depth to expose the screen, a touch position sensor configured to sense the position of a touch device that is used by a user when a distance between the screen and the touch device is shorter than the predetermined depth, a vibration sensor mounted on the display and configured to sense vibration of the display due to a contact of the touch device with the screen, and a controller configured to control the display to perform recording on a point of the screen that corresponds to the sensed position of the touch device when the vibration is sensed.

23 Claims, 9 Drawing Sheets

(56) References Cited

U.S. PATENT DOCUMENTS

| | | | | |
|---|---|---|---|---|
| 2008/0273013 A1* | 11/2008 | Levine | ............... | G06F 3/0421 345/173 |
| 2013/0002535 A1* | 1/2013 | Onishi | ............... | G01S 1/725 345/156 |
| 2013/0083401 A1* | 4/2013 | Hsuan | ............... | G02B 5/0294 359/601 |
| 2013/0120306 A1* | 5/2013 | Furukawa | ............... | G06F 3/041 345/173 |

* cited by examiner

DISPLAY APPARATUS

PRIORITY

This application claims priority under 35 U.S.C. §119(a) to Korean Patent Application No. 10-2013-0069290, filed on Jun. 17, 2013, in the Korean Intellectual Property Office, the disclosure of which is incorporated herein by reference, in its entirety.

BACKGROUND

1. Field

The exemplary embodiments relate to a display apparatus. More particularly, the exemplary embodiments relate to a display apparatus which can perform recording through a touch on a screen.

2. Description of the Related Art

Demand for a display device, which can perform recording, such as writing on a screen or drawing a picture, by having a touch device (e.g., electronic pen or user's finger) touch the screen, has been increased, and a representative example of such a display device may be an electronic board.

In such a display device, in order to specify a recording point on a screen, it is necessary to sense the position of a touch device. In order to sense the position of the touch device, for example, there is a scheme for a touch sensor which includes a plurality of LEDs arranged along an edge region of a screen to emit infrared rays along the screen and a plurality of phototransistors arranged to face the plurality of LEDs to sense the infrared rays emitted from the plurality of LEDs, and senses the touch position based on the change of a reception amount of infrared rays in the phototransistors depending on whether the touch device approaches or recedes from the screen.

According to this touch sensing scheme, in the case where not only the touch device comes in contact with the screen but also the touch device, which does not come in contact with the screen, enters into a space on the screen on which infrared rays are scanned, the touch device acts as an obstacle against the infrared rays and thus it is sensed that the screen is touched by the touch device.

Due to such a touch sensing error, unintended noisy portions may be displayed on the screen together with intended portions on which a user intends to perform recording, and this may result in deterioration of the performance of the display device.

SUMMARY

The exemplary embodiments have been made to address at least the above needs and to provide at least the advantages described below, and an aspect of the exemplary embodiments is to reduce or solve a touch sensing error in a display apparatus having a screen on which can perform recording by a user's touch.

According to one aspect of the exemplary embodiments, a display apparatus having a screen on which recording by a user's touch can be performed comprises a display configured to provide the screen; an accommodator configured to accommodate the display and having a screen aperture formed thereon with a predetermined depth to expose the screen; a touch position sensor configured to sense the position of a touch device that is used by a user when a distance between the screen and the touch device is shorter than the predetermined depth; a vibration sensor mounted on the display and configured to sense vibration of the display due to a contact of the touch device with the screen; and a controller configured to control the display to perform recording on a point of the screen that corresponds to the sensed position of the touch device in response to the vibration being sensed.

The display may include a display panel and a protection panel configured to be arranged in front of the display panel in order to protect the display panel, wherein the vibration sensor is mounted on the protection panel.

The vibration sensor may be mounted on a rear surface of the protection panel.

The touch position sensor may include an emitter configured to emit a medium for sensing the position of the touch device along the screen; and a receiver configured to receive the medium emitted by the emitter.

The accommodator may include a front portion on which the screen opening is formed, and the emitter and the receiver may be provided on the front portion.

The emitter may include a first emitter configured to emit the medium; and a second emitter configured to emit the medium at a position that is different from a position of the first emitter, and the receiver may include a first receiver configured to receive the medium that is emitted from the first emitter; and a second receiver configured to receive the medium at a position that is different from a position of the first receiver.

The accommodator may have first, second, third, and fourth inner walls that form the screen aperture; the first and second inner walls may be arranged to face each other, and the third and fourth inner walls may be arranged to face each other; and the first emitter and the first receiver may be arranged along the first and second inner walls, respectively, and the second emitter and the second receiver may be respectively arranged along the third and fourth inner walls, respectively.

The first and second emitters may respectively include a plurality of infrared LEDs arranged in a line, and the first and second receivers may respectively include a plurality of phototransistors arranged in a line.

The medium for sensing the position of the touch device may be infrared rays or ultrasonic waves.

The display apparatus may be an electronic board.

An aspect of an exemplary embodiment may provide a display apparatus having a screen on which a user's touch can be recorded, the display apparatus including: an accommodator having a screen aperture formed thereon with a predetermined depth to expose the screen; a touch position sensor configured to sense the position of a user touch when a distance between the screen and the touch device is shorter than the predetermined depth; a vibration sensor configured to sense vibration due to a contact of the touch device with the screen; and a controller configured to control the display to record a point of the screen that corresponds to the sensed position of the user touch when the vibration is sensed.

The display apparatus may further include a display configured to provide the screen.

The accommodator may be configured to accommodate the display. The vibration sensor may be mounted on the display and is configured to sense vibrations of the display.

The user touch may be provided by a touch device, wherein the touch device may be an electronic pen or a finger of a user.

The display may include: a display panel; and a protection panel configured to be arranged in front of the display panel in order to protect the display panel, wherein the vibration sensor is mounted on the protection panel.

The vibration sensor may be mounted on a rear surface of the protection panel. The touch position sensor may include: an emitter configured to emit a medium for sensing the position of the touch device along the screen; and a receiver configured to receive the medium emitted from the emitter.

The accommodator may include a front portion on which the screen opening is formed, and the emitter and the receiver are provided on the front portion of the accommodator.

In addition, the emitter may include: a first emitter configured to emit the medium; and a second emitter configured to emit the medium at a position that is different from a position of the first emitter.

The receiver may include: a first receiver configured to receive the medium that is emitted from the first emitter; and a second receiver configured to receive the medium at a position that is different from a position of the first receiver.

BRIEF DESCRIPTION OF THE DRAWINGS

The above and other aspects, features and advantages of the exemplary embodiments will be more apparent from the following detailed description when taken in conjunction with the accompanying drawings, in which.

DETAILED DESCRIPTION OF THE EXEMPLARY EMBODIMENTS

Hereinafter, various exemplary embodiments are described in detail with reference to the accompanying drawings.

Figure 1:
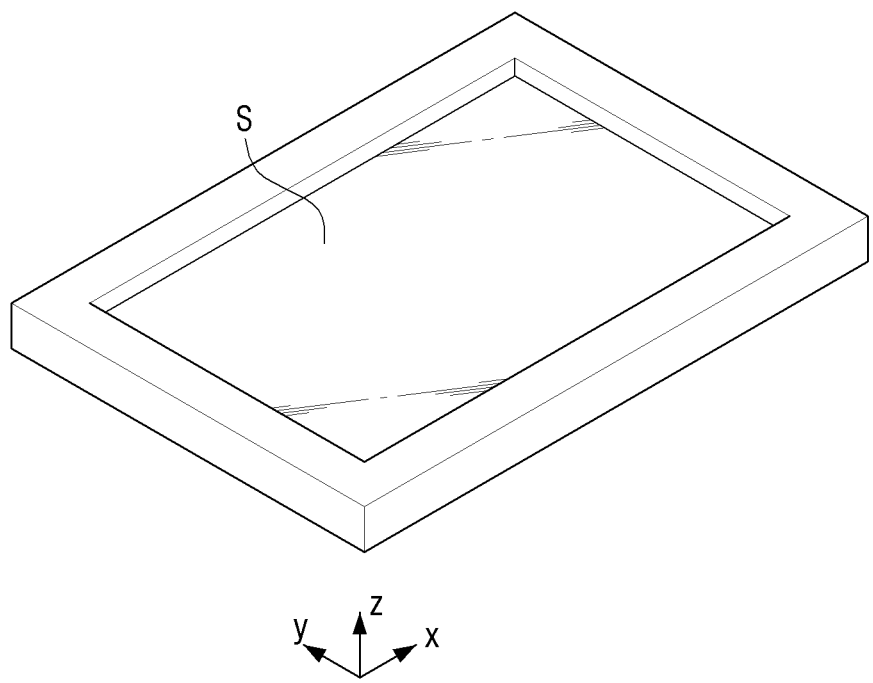
FIG. 1 is a perspective view of a display apparatus according to an exemplary embodiment.
Figure 2:
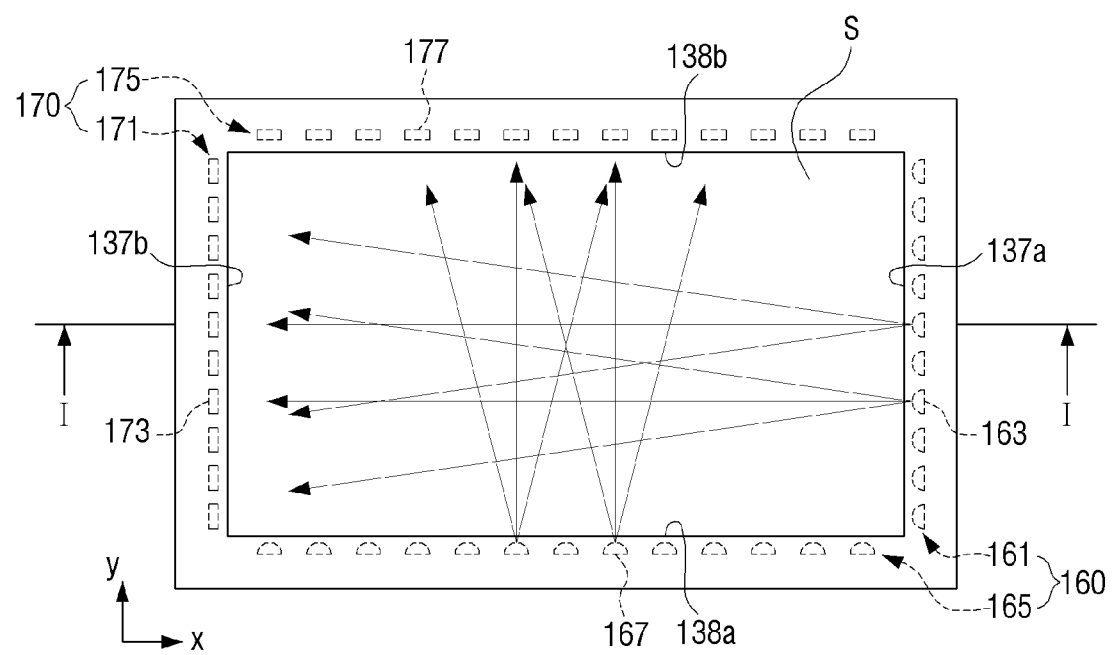
FIG. 2 is a plan view of the display apparatus illustrated in FIG. 1.
Figure 3:
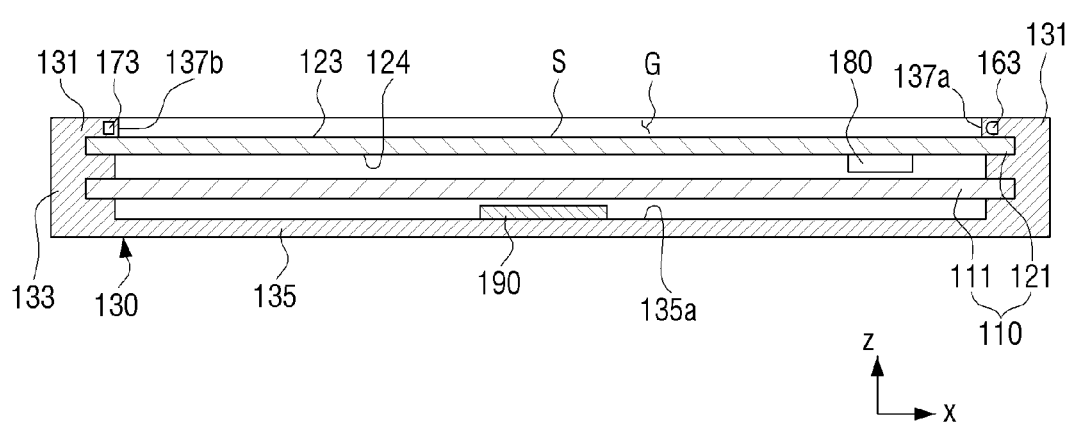
FIG. 3 is a cross-sectional view taken along line I-I of FIG. 2.
Figure 4:
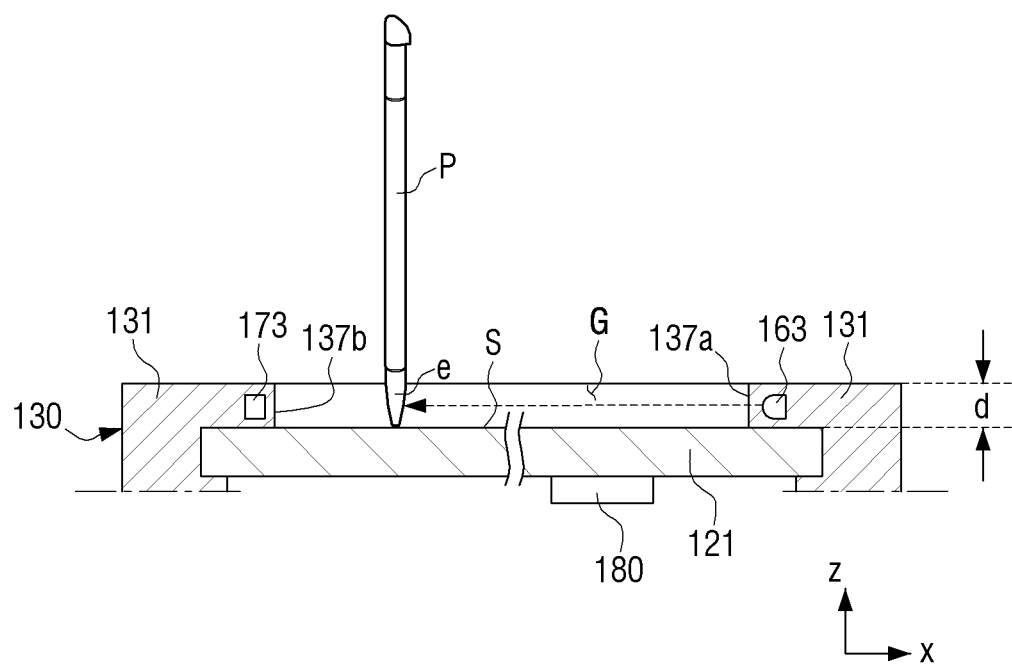
FIG. 4 is an enlarged view of an upper region in FIG. 3, in which a touch device comes in contact with a screen.
Figure 5:
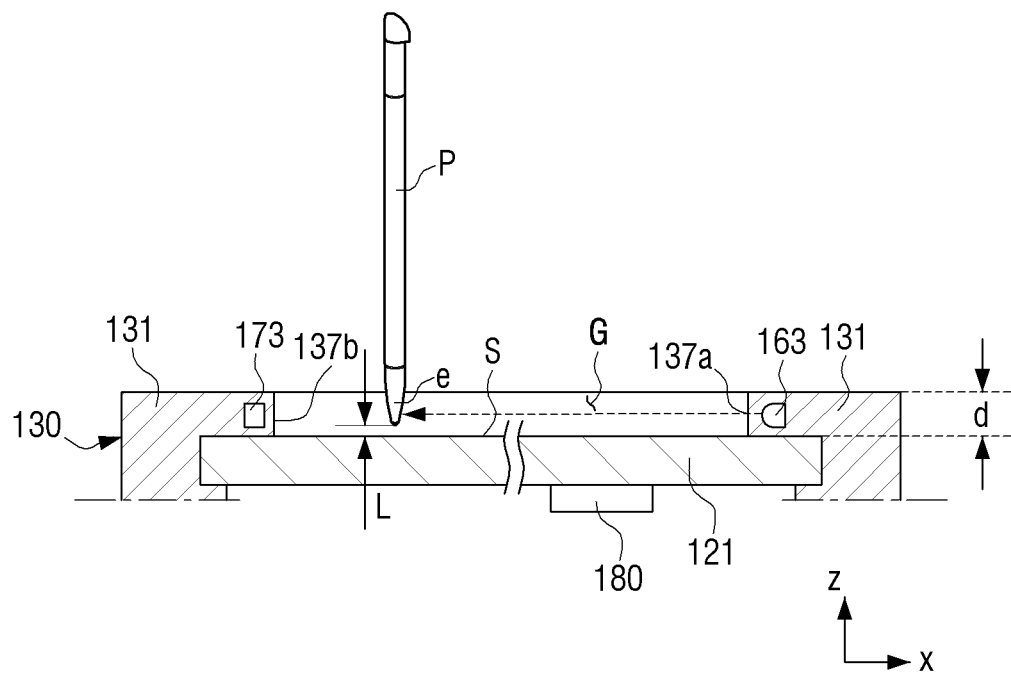
FIG. 5 is a view that is similar to FIG. 3, in which a touch device approaches a screen.
Figure 6:
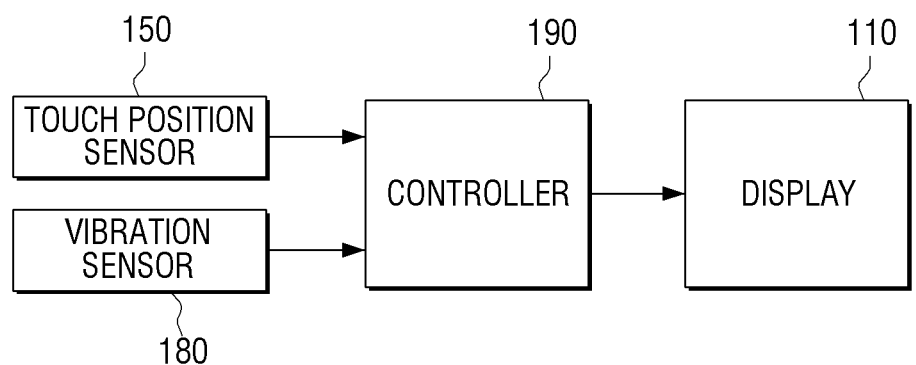
FIG. 6 is a block diagram which illustrates some elements of the display apparatus illustrated in FIG. 1.

FIG. 1 is a perspective view of a display apparatus according to an exemplary embodiment. FIG. 2 is a plan view of the display apparatus illustrated in FIG. 1, and FIG. 3 is a cross-sectional view taken along line I-I of FIG. 2. FIG. 4 is an enlarged view of an upper region in FIG. 3, in which a touch device comes in contact with a screen, and FIG. 5 is a view that is similar to FIG. 3, in which a touch device approaches a screen. FIG. 6 is a block diagram which illustrates some elements of the display apparatus of FIG. 1.

Referring to FIGS. 1 to 4, a display apparatus 100 according to an exemplary embodiment provides a screen S on which recording by a user's touch can be performed. In the description, "recording" is used as a wording that includes writing and drawing that may be performed on the screen S of the display apparatus 100. A user can perform writing or drawing on the screen S of the display apparatus 100 with a touch device, such as an electronic pen or a finger.

Such a display apparatus 100 includes a display 110, an accommodator 130, a touch position sensor 150, a vibration sensor 180, and a controller 190.

The display 110 includes a display panel 111 and a protection panel 121.

In this exemplary embodiment, the display panel 111 is provided with a liquid crystal display (LCD) panel. Alternatively, the display panel 111 may be provided with a different type of display panel, such as an organic light emitting display (OLED). Since the LCD panel is well known, the detailed description thereof will be omitted.

The protection panel 121 is arranged in front of the display panel 111. The protection panel 121 and the display panel 111 are arranged in parallel to be spaced apart by a predetermined distance from each other. Alternatively, the protection panel 121 may be arranged to come in contact with the display panel 11 without being spaced apart from each other. The protection panel 121 is made of a transparent material so that an image that is displayed on the display panel 111 penetrates the protection panel 121. In this exemplary embodiment, the protection panel 121 is made of transparent glass, and alternatively, the protection panel 121 may be made of another transparent material (e.g., transparent polymer resin).

Among an upper surface 123 of the protection panel 121, a portion, which is not hidden by the accommodator 130, but is exposed to an outside, becomes the screen S of the display 110. Since the screen S of the display 110 is provided on the protection panel 121, the display panel 111 that is arranged in the rear of the protection panel 121 can be protected without being damaged even upon a user touching the screen S.

The accommodator 130 accommodates the display 110 and the controller 190 therein. The accommodator 130 includes a front portion 131, a side portion 133 and a rear portion 135.

The front portion 131 covers an edge region of the protection panel 121 and has a screen aperture G formed thereon to expose the screen S to an outside. The screen aperture G is formed by four inner walls 137a, 137b, 138a, and 138b that are provided on the front portion 131. For convenience in explanation, two inner walls 137a and 137b that extend along the Y direction are called a first inner wall 137a and a second inner wall 137b, and two inner walls 138a and 138b that extend along the X direction are called a third inner wall 138a and a fourth inner wall 138b. The four inner walls 137a, 137b, 138a, and 138b are vertically arranged against the screen S. The height of the inner walls 137a, 137b, 138a, and 138b is constant, and the depth d of the screen aperture G is the same as the height of the inner walls 137a, 137b, 138a, and 138b.

The side portion 133 connects the front portion 131 and the rear portion 135 to each other, and is vertically arranged against the front portion 131 and the rear portion 135. The rear portion 135 covers the rear portion of the display 110.

In this exemplary embodiment, the accommodator 130 is configured as a single member. That is, the front portion 131, the side portion 138, and the rear portion 135 of the accommodator 130 are integrally formed. Alternatively, the front portion 131 and the side portion 133 may be formed as one member, and the rear portion 135 may be formed as another member, so that the two members may be coupled to each other. Further, the side portion 133 and the rear portion 135 may be formed as one member, and the front portion 131 may be formed as another member, so that the two members may be coupled to each other.

The touch position sensor 150 senses the position of the touch device that touches the screen S (e.g., an electronic pen or a user's finger), and includes an emitter 160 that emits infrared rays along the screen and a receiver 170 that receives the infrared rays emitted from the emitter 160.

The emitter 160 includes a first emitter 161 composed of a plurality of infrared LEDs 163 arranged along the first inner wall 137a on the front portion 131 of the accommodator 130, and a second emitter 165 composed of a plurality of infrared LEDs 167 arranged along the third inner wall 138a on the front portion 131 of the accommodator 130. The infrared LEDs 163 of the first emitter 161 emit infrared rays from the first inner wall 137a toward the second inner wall 137b along the screen S in the screen aperture G, and the infrared LEDs 167 of the second emitter 165 emit infrared rays from the third inner wall 138a toward the fourth inner wall 138b along the screen S in the screen aperture G.

The receiver 170 includes a first receiver 171 composed of a plurality of phototransistors 173 arranged along the second inner wall 137b on the front portion 131 of the accommodator 170, and a second receiver 175 composed of a plurality of phototransistors 177 arranged along the fourth inner wall 138b on the front portion 131 of the accommodator 130. The phototransistors 173 of the first receiver 171 receive the infrared rays emitted from the infrared LEDs 163 of the first emitter 161, and the phototransistors 177 of the second receiver 175 receive the infrared rays emitted from the infrared LEDs 167 of the second emitter 165.

As illustrated in FIG. 4, when the screen S is touched by the touch device P, reception amounts of infrared rays of the specific phototransistor 173 of the first receiver 171 and the specific phototransistor 177 of the second receiver 175, which correspond to the position of the touch device P, are decreased through light interception by the touch device P. In response to the reception amount of infrared rays being smaller than a predetermined reference value, the touch position sensor 150 senses the position of the touch device P through generation of positional signals indicating the position of the touch device P in the first direction (Y direction) and the second direction (X direction).

As illustrated in FIG. 5, even in the case where the touch device P, which does not touch the screen S, approaches the screen S and an end portion e of the touch device P enters into the screen aperture G, light interception by the touch device P occurs, and thus the touch position sensor 150 senses the position of the touch device P. It is understood, in FIG. 5 that the touch position sensor 150 recognizes the touch of the screen S by the touch device P.

That is, not only in the case where the touch device P touches the screen S as shown in FIG. 4 but also in the case where the touch device P, which does not touch the screen S, approaches the screen S and the end portion (pen tip) e of the touch device P enters into the screen aperture G, the touch position sensor 150 generates a positional signal which indicates the position of the touch device P and transmits the generated positional signal to the controller 190. In other words, in response to the distance L between the screen S and the touch device P being shorter than the depth d of the screen aperture G, the touch position sensor 150 recognizes that the screen S is touched by the touch device P. Considering this, the depth d of the screen opening G may be called a "touch recognition depth."

The vibration sensor 180 is mounted on the display 110 and senses vibration of the display 110 due to the contact with the touch device. More specifically, as illustrated in FIG. 3, the vibration sensor 180 is mounted on the rear surface 124 of the protection panel 121 of the display 110, and senses the vibration of the protection panel 121 due to the contact with the touch device in order to generate and transmit a vibration signal to the controller 190.

The controller 190 is provided in the form of a circuit board inside the accommodator 130. In this exemplary embodiment, the controller 190 is mounted on the inner surface 135a of the rear portion 135 of the accommodator 130, but is not limited thereto. The mount position of the controller 190 may be changed differently from that according to this exemplary embodiment.

The controller 190 controls the operation of the display 110 based on the positional signal transmitted from the touch position sensor 150 and the vibration signal transmitted from the vibration sensor 180.

For this, referring to FIGS. 7 and 8, a case where characters "abc" are recorded on the screen S of the display apparatus 100 will be described as an example.

Figure 7:
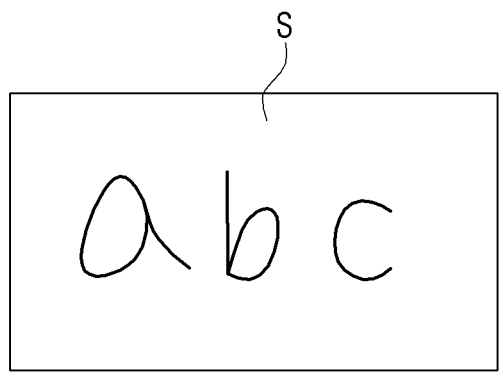
FIG. 7 is a plan view which illustrates an example that characters "abc" are recorded on a screen of the display apparatus illustrated in FIG. 1.
Figure 8:
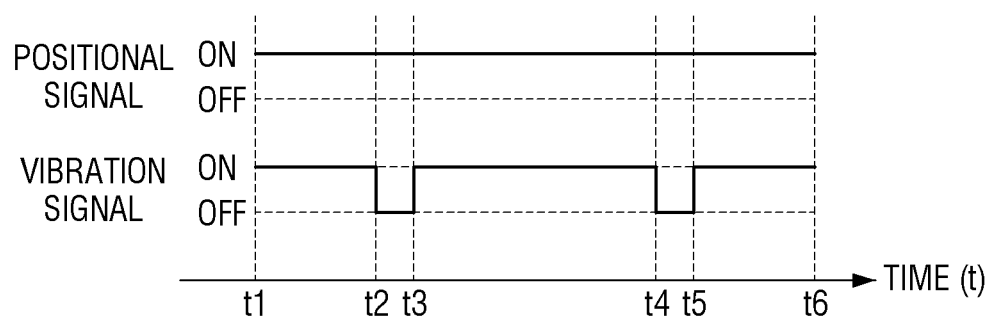
FIG. 8 is a graph showing a positional signal that is generated by a touch position sensor and a vibration signal that is generated by a vibration sensor in the course of time while characters "abc" are recorded on a screen of the display apparatus illustrated in FIG. 1.

FIG. 7 is a plan view which illustrates an example where characters "abc" are recorded by a user's touch on a screen of the display apparatus illustrated in FIG. 1, and FIG. 8 is a graph showing the positional signal that is generated by the touch position sensor and the vibration signal that is generated by the vibration sensor in the course of time while the characters "abc" are recorded on the screen of the display apparatus illustrated in FIG. 1.

During a time t1-t2 when "a" is recorded, a time t3-t4 when "b" is recorded, and a time t5-t6 when "c" is recorded, as shown in FIG. 4, the screen S is touched by the touch device P. Accordingly, as illustrated in FIG. 8, during the times (t1-t2, t3-t4, and t5-t6), the touch position sensor 150 and the vibration sensor 180 continuously generates the positional signal and the vibration signal. That is, the positional signal and the vibration signal are all in an ON state.

On the other hand, during the time t2-t3 before the recording of "b" starts after the recording of "a" is completed and the time t4-t5 before the recording of "c" starts after the recording of "b" is completed, in most cases, the screen S is not touched by the touch device P, but the end portion e of the touch device P is arranged in the above-described touch recognition depth d as shown in FIG. 5. Accordingly, as illustrated in FIG. 8, during the times t2-t3 and t4-t5, the touch position sensor 150 generates the positional signals, but the vibration sensor 180 does not generate the vibration signal. That is, the positional signal is in an ON state, but the vibration signal is in an OFF state.

In response to the vibration being sensed by the vibration sensor 180, the controller 190 of the display apparatus 100 as described above controls the display 110 to perform recording at a screen point which corresponds to the position of the touch device P that is sensed by the touch position sensor 150. That is, the controller 190 controls the display 110 to only perform the recording when both the positional signal and the vibration signal are in an ON state.

Accordingly, during the time t2-t3 before the recording of "b" starts after the recording of "a" is completed and the time t4-t5 before the recording of "c" starts after the recording of "b" is completed, the recording is not performed on the screen S of the display apparatus 100. Accordingly, as illustrated in FIG. 7, nothing is recorded between the character "a" and the character "b" and between the character "b" and the character "c". Accordingly, "abc" that the user intends to record can be neatly recorded.

Figure 9:
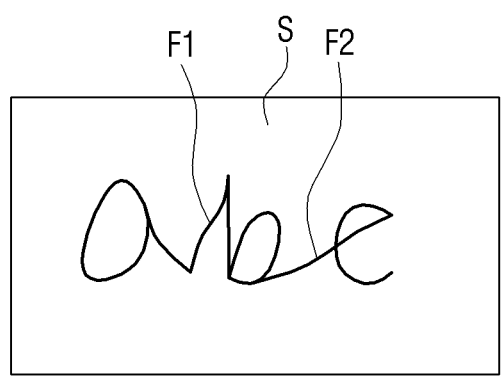
FIG. 9 is a plan view that is similar to FIG. 7, which illustrates a case where a vibration sensor is not applied to the display apparatus illustrated in FIG. 1.

In response the vibration sensor 180 not being applied to the display apparatus 100, the controller 190 is unable to accurately identify whether the screen S is touched by the touch device P. In this case, the controller 190 controls the display 110 to perform the recording during the whole time (t1-t6 in FIG. 8) when the positional signal is transmitted by the touch position sensor 150. Accordingly, in the case where the vibration sensor 180 is not applied, as illustrated in FIG. 9, even during the time t2-t3 before the recording of "b" starts after the recording of "a" is completed and the time t4-t5 before the recording of "c" starts after the recording of "b" is completed, the recording is performed, and thus noisy portions F1 and F2, which are not intended by the user, are recorded together.

In the display apparatus 100 as described above, it is exemplified that the infrared rays are used as the medium for sensing the position of the touch device. However, ultrasonic waves may be alternatively used instead of the infrared rays. In this case, the LEDs that constitute the emitter 160 of the touch position sensor 150 will be replaced by ultrasonic wave generating elements, and the phototransistors that constitute the receiver 170 of the touch position sensor 150 will be replaced by ultrasonic wave sensing elements.

The display apparatus 100 as described above may be applied to various types of display apparatuses, and in particular, may be usefully applied to display apparatuses of relatively large size, such as an electronic board.

While exemplary embodiments have been shown and described, it will be understood by those skilled in the art that various changes in form and detail may be made therein without departing from the spirit and scope of the present disclosure, as defined by the appended claims.

What is claimed is:

1. A display apparatus having a screen on which recording a touch input can be performed, the display apparatus comprising:
    a display configured to provide the screen;
    an accommodator configured to accommodate the display and having a screen aperture formed thereon with a predetermined depth to expose the screen;
    a vibration sensor mounted on the display and configured to sense vibration of the display due to a contact of a touch device with the screen to generate a vibration signal;
    a touch position sensor configured to operate independent of the vibration sensor and to sense the position of the touch device to generate a positional signal when a distance between the screen and the touch device is shorter than the predetermined depth; and
    a controller configured to control the display to display a track of a movement of the touch device on the screen in response to both the vibration signal and the positional signal being in an ON state,
    wherein the controller is configured to control the display to stop displaying the track of the movement of the touch device on the screen in response to the vibration signal being in an OFF state and the positional signal being in an ON state.

2. The display apparatus as claimed in claim 1, wherein the display comprises:
    a display panel; and
    a protection panel configured to be arranged in front of the display panel in order to protect the display panel,
    wherein the vibration sensor is mounted on the protection panel.

3. The display apparatus as claimed in claim 2, wherein the vibration sensor is mounted on a rear surface of the protection panel.

4. The display apparatus as claimed in claim 1, wherein the touch position sensor comprises:
    an emitter configured to emit a medium for sensing the position of the touch device along the screen; and
    a receiver configured to receive the medium emitted from the emitter.

5. The display apparatus as claimed in claim 4, wherein the accommodator comprises a front portion on which the screen opening is formed, and the emitter and the receiver are provided on the front portion of the accommodator.

6. The display apparatus as claimed in claim 4, wherein the emitter includes:
    a first emitter configured to emit the medium; and
    a second emitter configured to emit the medium at a position that is different from a position of the first emitter, and
    the receiver includes:
    a first receiver configured to receive the medium that is emitted from the first emitter; and
    a second receiver configured to receive the medium at a position that is different from a position of the first receiver.

7. The display apparatus as claimed in claim 6, wherein the accommodator has first, second, third, and fourth inner walls that form the screen aperture, the first and second inner walls are arranged to face each other, and the third and fourth inner walls are arranged to face each other; and
    the first emitter and the first receiver are respectively arranged along the first and second inner walls, and the second emitter and the second receiver are respectively arranged along the third and fourth inner walls.

8. The display apparatus as claimed in claim 6, wherein the first and second emitters include a plurality of infrared LEDs respectively arranged in a line, and the first and second emitters include a plurality of phototransistors respectively arranged in a line.

9. The display apparatus as claimed in claim 4, wherein the medium for sensing the position of the touch device is infrared rays or ultrasonic waves.

10. The display apparatus as claimed in claim 1, wherein the display apparatus is an electronic board.

11. The display apparatus of claim 1, wherein the touch position sensor is working without trigger of the vibration sensor.

12. A display apparatus having a screen on which a touch input can be recorded, the display apparatus comprising:
    an accommodator having a screen aperture formed thereon with a predetermined depth to expose the screen;
    a vibration sensor configured to sense vibration due to a contact of a touch device with the screen to generate a vibration signal;
    a touch position sensor configured to operate independent of the vibration sensor and to sense the position of the touch device to generate a positional signal when a distance between the screen and the touch device is shorter than the predetermined depth; and
    a controller configured to control the display to record a track of a movement of the touch device on the screen in response to both the vibration signal and the positional signal being in an ON state,
    wherein the controller is configured to control the display to stop displaying the track of the movement of the touch device on the screen in response to the vibration signal being in an OFF state and the positional signal being in an ON state.

13. The display apparatus of claim 12, further comprising a display configured to provide the screen.

14. The display apparatus of claim 13, wherein the accommodator is configured to accommodate the display.

15. The display apparatus of claim 14, wherein the accommodator comprises a front portion on which the screen opening is formed, and the emitter and the receiver are provided on the front portion of the accommodator.

16. The display device of claim 13, wherein the display comprises:
   a display panel; and
   a protection panel configured to be arranged in front of the display panel in order to protect the display panel,
   wherein the vibration sensor is mounted on the protection panel.

17. The display apparatus of claim 16, wherein the vibration sensor is mounted on a rear surface of the protection panel.

18. The display apparatus of claim 12, wherein the vibration sensor is mounted on the display and is configured to sense vibrations of the display.

19. The display apparatus of claim 12, wherein the touch input is provided by a touch device.

20. The display apparatus of claim 19, wherein touch device is an electronic pen or a finger of a user.

21. The display apparatus of claim 19, wherein the touch position sensor comprises:
   an emitter configured to emit a medium for sensing the position of the touch device along the screen; and
   a receiver configured to receive the medium emitted from the emitter.

22. The display apparatus as claimed in claim 21, wherein the emitter includes:
   a first emitter configured to emit the medium; and
   a second emitter configured to emit the medium at a position that is different from a position of the first emitter.

23. The display apparatus of claim 22, wherein the receiver includes:
   a first receiver configured to receive the medium that is emitted from the first emitter; and
   a second receiver configured to receive the medium at a position that is different from a position of the first receiver.

* * * * *